United States Patent
Castro et al.

(10) Patent No.: US 10,502,360 B2
(45) Date of Patent: Dec. 10, 2019

(54) GAMING SYSTEMS, ELECTRONIC GAMING MACHINES, AND MOUNTING ASSEMBLIES FOR ELECTRONIC DISPLAY DEVICE ARRANGEMENTS

(71) Applicant: Bally Gaming, Inc., Las Vegas, NV (US)

(72) Inventors: Christian L. Castro, Chicago, IL (US); Robert J. Glenn, II, Chicago, IL (US); Paul M. Lesley, Blue Island, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 232 days.

(21) Appl. No.: 14/713,070

(22) Filed: May 15, 2015

(65) Prior Publication Data
US 2016/0335836 A1 Nov. 17, 2016

(51) Int. Cl.
*G07F 17/32* (2006.01)
*F16M 13/02* (2006.01)

(52) U.S. Cl.
CPC ......... *F16M 13/02* (2013.01); *G07F 17/3202* (2013.01); *G07F 17/3211* (2013.01); *G07F 17/3286* (2013.01); *F16M 2200/025* (2013.01)

(58) Field of Classification Search
CPC ....... A63F 13/08; B23P 11/00; G07F 17/3216
See application file for complete search history.

(56) References Cited

U.S. PATENT DOCUMENTS

| | | | |
|---|---|---|---|
| 4,440,457 A | 4/1984 | Fogelman | |
| 4,534,534 A * | 8/1985 | Hess | B60N 2/0232 248/424 |
| 4,584,603 A * | 4/1986 | Harrison | B64D 11/0015 244/118.5 |
| 4,718,672 A | 1/1988 | Okada | |
| 4,865,322 A | 9/1989 | Krutsch | |
| 5,110,120 A | 5/1992 | Smolucha | |
| 5,544,728 A | 8/1996 | Dabrowski | |

(Continued)

FOREIGN PATENT DOCUMENTS

| | | |
|---|---|---|
| EP | 0 886 250 A1 | 12/1998 |
| GB | 2 136 255 A | 9/1984 |

(Continued)

*Primary Examiner* — Xuan M Thai
*Assistant Examiner* — Malina D. Blaise
(74) *Attorney, Agent, or Firm* — Marvin A. Hein

(57) ABSTRACT

Presented herein are gaming systems, electronic gaming machines, and mounting bracket assemblies for mounting display assemblies to gaming cabinets. An electronic gaming machine is disclosed which includes a gaming cabinet and an electronic display assembly with one or more video display panels mounted to a display housing. Each video display panel displays aspects of a wagering game. A mounting bracket assembly includes a first bracket attached to the display housing (or gaming cabinet), and a second bracket attached to the gaming cabinet (or display housing). The first bracket includes a connecting plate with one or more ramped channels and a stopping member. The second bracket includes a connecting plate with one or more ramped rails and a stopping member. The display assembly is mounted onto the cabinet by sliding each ramped rail of the first bracket into a respective ramped channel of the second bracket and mating the stopping members.

18 Claims, 7 Drawing Sheets

(56) References Cited

U.S. PATENT DOCUMENTS

| | | |
|---|---|---|
| 5,681,220 A | 10/1997 | Bertram |
| 5,788,573 A | 8/1998 | Baerlocher |
| 5,813,914 A | 9/1998 | McKay et al. |
| 5,823,874 A | 10/1998 | Adams |
| D403,363 S | 12/1998 | McGahn et al. |
| D404,436 S | 1/1999 | McGahn et al. |
| D416,054 S | 11/1999 | McGahn et al. |
| 6,068,101 A | 5/2000 | Dickenson |
| 6,135,884 A | 10/2000 | Hedrick et al. |
| 6,164,645 A | 12/2000 | Weiss |
| 6,254,481 B1 | 7/2001 | Jaffe |
| 6,270,411 B1 | 8/2001 | Gura |
| 6,287,194 B1 | 9/2001 | Okada |
| D451,150 S | 11/2001 | Hedrick et al. |
| D451,151 S | 11/2001 | Hedrick et al. |
| D451,152 S | 11/2001 | Hedrick et al. |
| 6,315,660 B1 | 11/2001 | DeMar |
| 6,322,309 B1 | 11/2001 | Thomas |
| 6,368,216 B1 | 4/2002 | Hedrick et al. |
| 6,474,758 B1 * | 11/2002 | Hedrick ............... G07F 17/32 312/223.1 |
| 6,475,087 B1 | 11/2002 | Cole |
| 6,497,617 B1 | 12/2002 | Yoshida |
| 6,517,433 B2 | 2/2003 | Loose et al. |
| 6,537,152 B2 | 3/2003 | Seelig |
| 6,575,541 B1 | 6/2003 | Hedrick et al. |
| 6,623,006 B2 | 9/2003 | Weiss |
| 6,758,473 B2 | 7/2004 | Seelig |
| 6,820,875 B1 | 11/2004 | Hedrick et al. |
| 7,267,613 B2 * | 9/2007 | Cole ..................... G07F 17/32 463/20 |
| 7,341,511 B2 | 3/2008 | Fiden |
| 7,387,572 B2 | 6/2008 | Hanchar |
| 7,452,280 B2 | 11/2008 | Kopera et al. |
| 7,513,830 B2 | 4/2009 | Hajder |
| 7,540,806 B2 | 6/2009 | Tastad |
| 7,594,852 B2 | 9/2009 | Rasmussen |
| 7,611,408 B2 | 11/2009 | Martin |
| 7,806,770 B2 | 10/2010 | Taxon |
| 7,892,096 B2 | 2/2011 | Rigsby et al. |
| 7,905,783 B2 | 3/2011 | Cole |
| 8,000,484 B2 | 8/2011 | Rasmussen |
| 8,012,026 B2 | 9/2011 | Dreyer et al. |
| 8,016,682 B2 * | 9/2011 | Stephenson, III .. G07F 17/3211 463/20 |
| 8,016,683 B2 | 9/2011 | Cole |
| 8,057,303 B2 | 11/2011 | Rasmussen et al. |
| 8,172,688 B2 | 5/2012 | Cole |
| 8,226,459 B2 | 7/2012 | Barrett et al. |
| 8,303,420 B2 | 11/2012 | Chudek et al. |
| 8,678,936 B2 | 3/2014 | Lesley et al. |
| 8,747,225 B2 | 6/2014 | Canterbury et al. |
| 2001/0048587 A1 | 12/2001 | Yim |
| 2003/0027627 A1 | 2/2003 | Cole |
| 2004/0018870 A1 | 1/2004 | Cole |
| 2004/0023556 A1 | 2/2004 | Smith |
| 2004/0048672 A1 * | 3/2004 | Hussaini ................ A63F 13/02 463/46 |
| 2004/0048674 A1 * | 3/2004 | Hussaini ................ A63F 13/02 463/46 |
| 2004/0121645 A1 | 6/2004 | Postrel |
| 2004/0248648 A1 | 12/2004 | Rothschild |
| 2005/0003886 A1 | 1/2005 | Englman |
| 2005/0051964 A1 | 3/2005 | Nordman |
| 2005/0054449 A1 | 3/2005 | Kopera |
| 2005/0059496 A1 * | 3/2005 | Hanchar ................ G07F 17/32 463/46 |
| 2005/0064942 A1 | 3/2005 | Hedrick et al. |
| 2005/0168926 A1 * | 8/2005 | Lee ........................ G06F 1/16 361/679.06 |
| 2005/0202879 A1 | 9/2005 | Hussaini et al. |
| 2005/0207100 A1 | 9/2005 | Heckerman |
| 2005/0215325 A1 | 9/2005 | Nguyen et al. |
| 2005/0261057 A1 | 11/2005 | Bleich |
| 2006/0073900 A1 | 4/2006 | Cole |
| 2006/0154732 A1 * | 7/2006 | Tastad ..................... A63F 13/08 463/46 |
| 2006/0183544 A1 | 8/2006 | Okada |
| 2006/0199647 A1 * | 9/2006 | Anderson ............... A63F 13/08 463/46 |
| 2006/0277805 A1 | 12/2006 | Kopera |
| 2007/0099698 A1 | 5/2007 | Cole |
| 2007/0298880 A1 * | 12/2007 | Rasmussen ............. G07F 17/34 463/31 |
| 2008/0113820 A1 * | 5/2008 | Tedsen ..................... G07F 17/32 463/46 |
| 2008/0113821 A1 * | 5/2008 | Beadell ................... G07F 17/32 463/46 |
| 2008/0182642 A1 | 7/2008 | Cole |
| 2008/0265503 A1 | 10/2008 | Wudtke |
| 2009/0209324 A1 | 8/2009 | Graf |
| 2009/0264194 A1 | 10/2009 | Kompella |
| 2009/0325692 A1 | 12/2009 | Klostermann |
| 2010/0000052 A1 * | 1/2010 | Chung ..................... E05D 15/58 16/364 |
| 2010/0038516 A1 * | 2/2010 | Trueb ....................... E04D 13/00 248/544 |
| 2010/0087259 A1 | 4/2010 | Johnson et al. |
| 2010/0173704 A1 * | 7/2010 | Cole ........................ G07F 17/32 463/30 |
| 2011/0314654 A1 | 12/2011 | Cole |
| 2012/0220353 A1 * | 8/2012 | Massing ............. G07F 17/3213 463/16 |
| 2012/0315985 A1 | 12/2012 | Granger |
| 2013/0079157 A1 | 3/2013 | Chudek et al. |
| 2013/0157751 A1 * | 6/2013 | Loose .................. G07F 17/3211 463/25 |

FOREIGN PATENT DOCUMENTS

| | | |
|---|---|---|
| WO | WO 03/028829 A1 | 4/2003 |
| WO | WO 2005/029220 A2 | 3/2005 |
| WO | WO 2007/089410 A2 | 8/2007 |

* cited by examiner

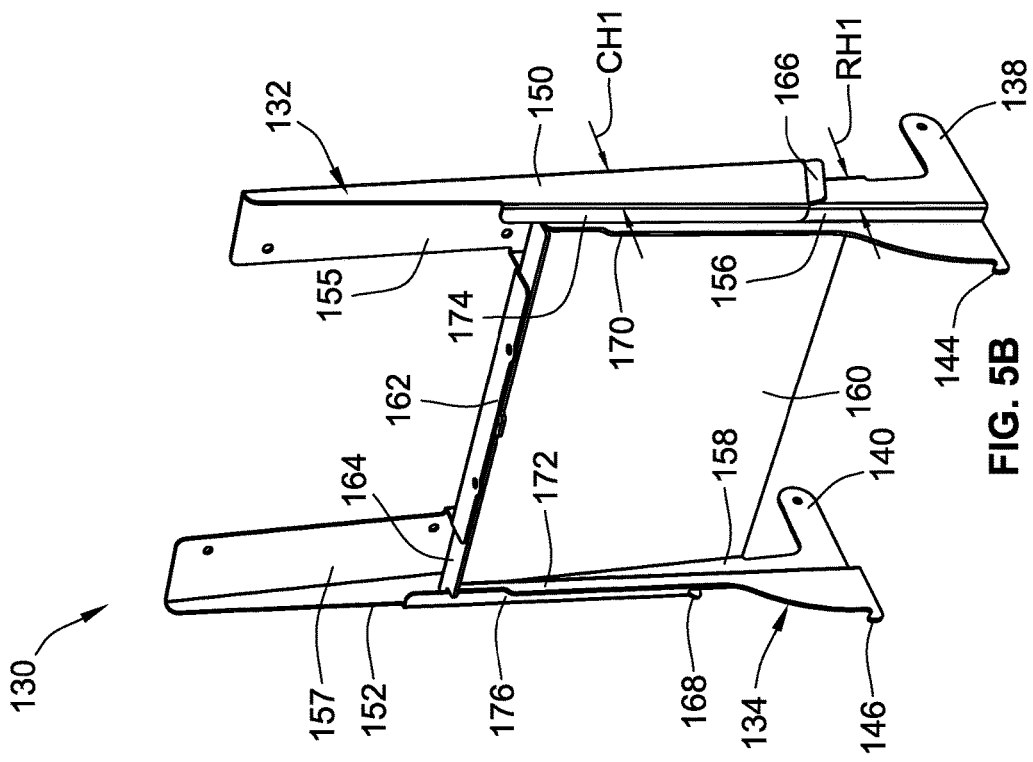
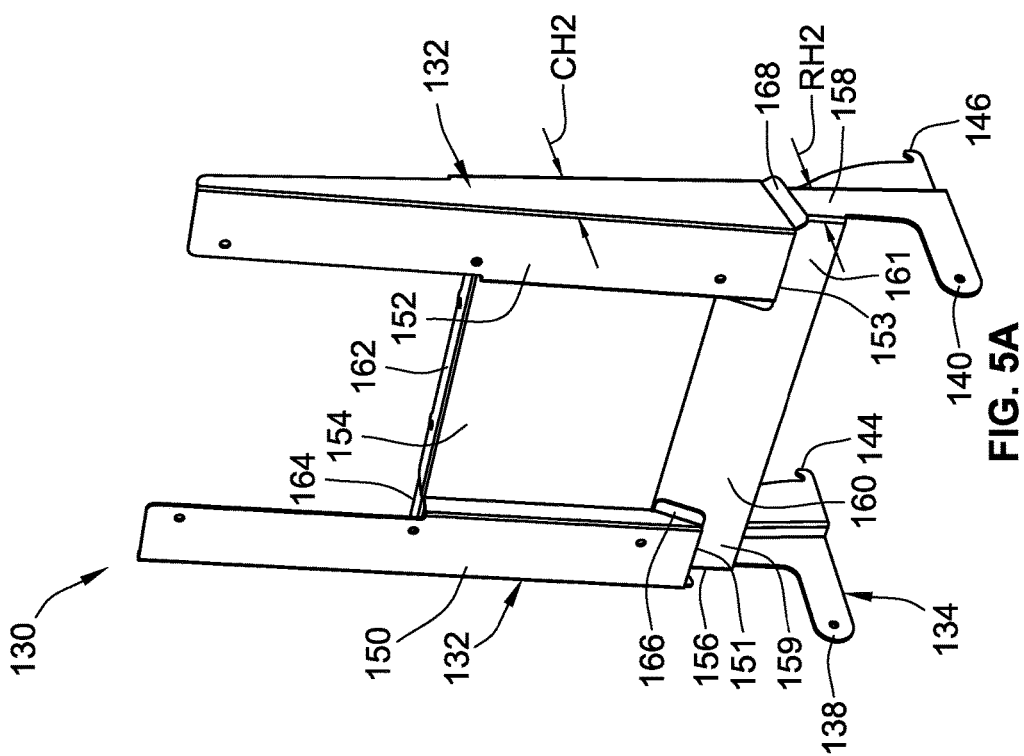

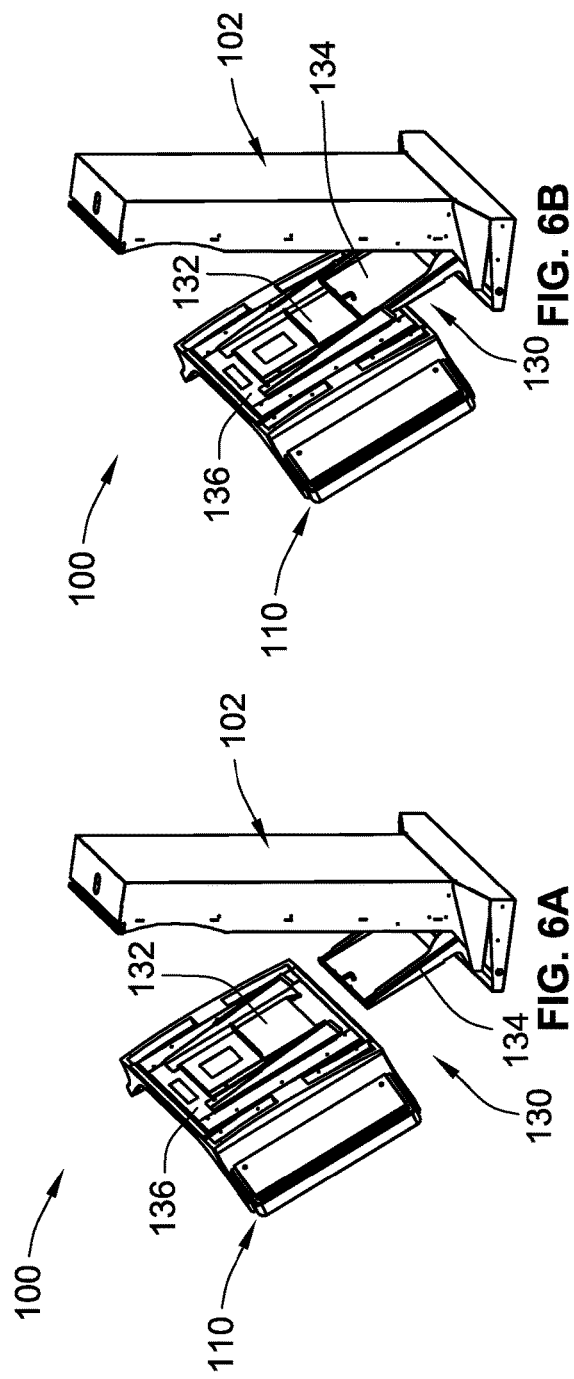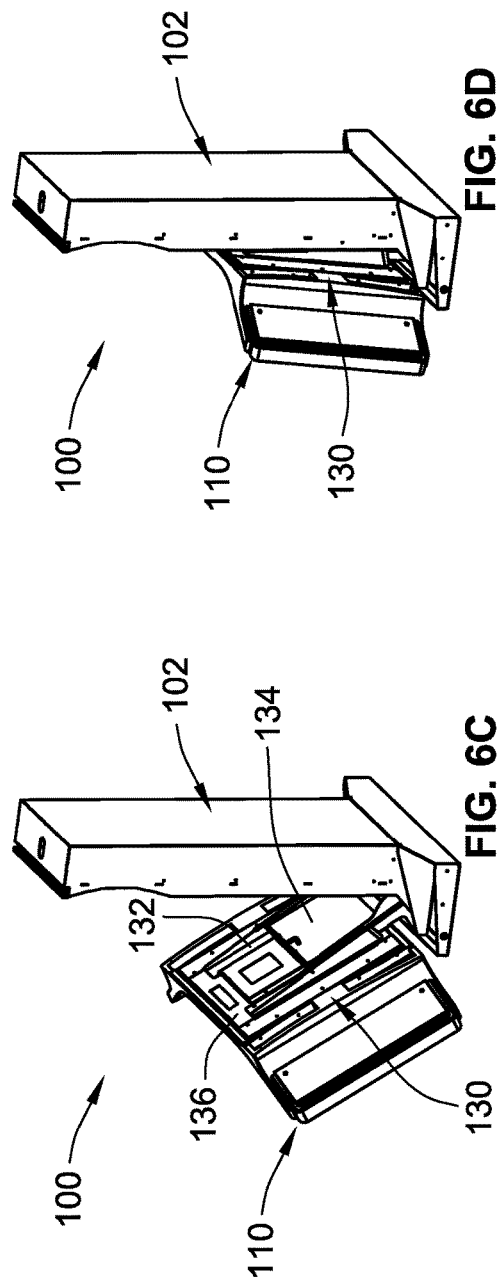

GAMING SYSTEMS, ELECTRONIC GAMING MACHINES, AND MOUNTING ASSEMBLIES FOR ELECTRONIC DISPLAY DEVICE ARRANGEMENTS

COPYRIGHT

A portion of the disclosure of this patent document contains materials which are subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present disclosure relates generally to electronic wagering game machines, casino gaming systems, gaming networks, and methods for assembling wagering game terminals. More particularly, aspects of the present disclosure relate to mounting assemblies for attaching and detaching video display devices from floor-standing electronic wagering game terminals.

BACKGROUND

Electronic gaming machines (EGM), such as slot machines, video poker machines, and the like, have become a cornerstone of the gaming industry. Generally, the popularity of such machines with players is dependent on the likelihood (or perceived likelihood) of winning money at the machine and the entertainment value of the machine relative to other available gaming options. Where the available gaming options include a number of competing machines, and the expectation of winning at each machine is roughly the same (or believed to be the same), players are typically attracted to the most engaging, entertaining and exciting machines. Shrewd operators consequently strive to employ technologically advanced gaming devices that can provide the most engaging, entertaining and exciting game features and enhancements because such devices attract frequent play and, hence, increase profitability to the operator. Thus, gaming manufacturers continuously endeavor to develop advanced gaming machines with improved gaming enhancements that will attract frequent play and player loyalty through enhanced entertainment value to the player.

One way to improve the gaming experience and increase the entertainment value of a particular wagering game is to enhance the display features of the electronic gaming machine associated with that wagering game. Most gaming machines include a variety of visual attractions and displays, such as models, signs, and other forms of information. These items typically include fixed permanently-printed glass, video display devices, artwork, models, and marquees. In many gaming regions, industry regulations in fact require every gaming terminal include top-box mounted lighting and signage that indicate, for example, the class of machine, when the machine is out of funds, when the machine is malfunctioning, etc. For gaming machines with electronic video display devices, improvements in hi-definition video technology, such as liquid crystal display (LCD) panels, plasma display panels, and light emitting diode (LED) displays, have enabled the presentation of richer and more colorful graphics.

Historically, an electronic gaming machine is limited to a primary display device and, for many models, a dedicated top box display arrangement that may include a top-box mounted marquee assembly, video display device, or permanently-printed signage. For most conventional multi-display configurations, the gaming terminal's primary and top-box mounted display devices are rigidly mounted to the cabinet, juxtaposed one on top of the other in a generally parallel, often coplanar layout. To alter game offerings or modify the display configuration of a conventional gaming terminal, casino operators or contracted technicians were therefore required to replace the entire gaming machine. The replacement process is costly, time consuming, and counterproductive to maintaining pace with the continuously changing gambling industry.

In response, many gaming machine manufacturers, especially those that produce video-based gaming machines, have developed a basic gaming terminal (e.g., one that is universal to a variety of game offerings) that allows multiple games to be presented on the same machine, allowing easy conversion to a new game. For instance, if a casino operator decides that a certain video slot game has reached the end of its useful playing life on the casino floor, the operator contacts the manufacturer and requests conversion of the gaming machine to a newer, perhaps more popular and more profitable game. Conversion of the video-based wagering game machine is a relatively simple task, merely requiring a change of software and, perhaps, a modification of surface artwork on the gaming machine's cabinet. Most of these universal gaming terminals, however, do not allow for simplified modification, replacement or repair of the terminals display devices.

Converting a gaming machine to a new game may require previously employed display devices be removed and modified. There are also instances where a cabinet mounted display device simply needs to be removed for replacement or repair. This process can be time-consuming, cumbersome, expensive, and can result in damage to the display device or the gaming terminal. In many cases, replacing a cabinet-mounted display or marquee typically necessitates at least two service technicians. Time and labor costs are further compounded by the complexity in electrically disconnecting, physically dismounting, managing the bulk and weight of the assembly, and subsequently mounting and connecting a new assembly. This often requires opening and dismantling a significant portion of the gaming terminal to complete the electrical connections. There is therefore a need to develop improved mounting interfaces and gaming machines with improved mounting interfaces for facilitating and simplifying the removal and replacement process of cabinet-mounted displays.

SUMMARY

Aspects of the present disclosure are directed to electronic gaming machines (EGM), casino gaming systems and networks, mounting assemblies for electronic display devices, and methods of mounting display devices onto gaming machine cabinets. Disclosed, for example, is a mounting bracket assembly for mounting a multi-display arrangement to a floor-standing wagering game terminal. Depending on the desired configuration, two or three or more video display panels are secured together in side-by-side relationship via a display housing. Each video display panel is oriented at an oblique angle with respect to any neighboring display panels. For instance, a central display panel (e.g., a 26.5" 1920×1920 QHD LCD panel) is centrally mounted to the display housing and configured to be mounted on the cabinet above the cabinet's player input (button-panel) deck. This central display panel is flanked on its lateral sides by left-hand-side and right-hand-side display panels (e.g., two 21.5" 1920×1080 HD LCD panels), each of which is obliquely angled, e.g., approximately 145 degrees, with respect to the central display panel. Alternative configurations may comprise multiple identical display panels (e.g., three 27" 1920×1080 HD LCD panels) juxtaposed in side-by-side non-coplanar relationship.

To facilitate and simplify the attachment and removal of this multi-display arrangement, a mounting bracket assembly is provided for coupling the displays to the cabinet, for example, in a horizontal (landscape) orientation or a vertical (portrait) orientation. A first (female) bracket is provided which couples to the display devices via the display housing. The first bracket includes a pair of mounting channels—a first ramped channel spaced laterally from a second ramped channel—that are connected via a first intermediate connecting plate. In addition, a second (male) bracket is provided which pivotably couples to the gaming machine cabinet, e.g., via first and second pivot arms. The second bracket includes a pair of mounting rails—a first ramped rail spaced laterally from a second ramped rail—that are connected via a second intermediate connecting plate. It is desirable, for at least some configurations, that the first bracket is a single-piece unitary structure, while the second bracket is a single-piece unitary structure that is distinct from the single-piece unitary first bracket.

To mount the display arrangement to the cabinet, the second bracket is pivoted from a first (functional) position, whereat the second bracket is in a generally vertical orientation with respect to the cabinet, to a second (non-functional) position, whereat the second bracket is in a generally oblique orientation with respect to the cabinet. The display arrangement, including the display housing and the first bracket, is then positioned such that openings at respective ends of the first and second ramped channels align with respective proximal ends of the first and second ramped rails. The ramped rails are slid in a telescoping manner into their respective ramped channels until a stopping flange of the first intermediate connecting plate seats on top of a stopping shelf of the second intermediate connecting plate. Mechanical fasteners are then applied to secure the first bracket to the second bracket, and electrical connectors for the display devices are contemporaneously connected. The second bracket is then pivoted from the second position back to the first position and locked into place, for example, with a selectively releasable ratchet-and-pawl latch.

Aspects of the present disclosure are directed to electronic gaming machines (EGM), such as floor-standing casino slot machines, for conducting wagering games. For example, disclosed herein is an EGM that is primarily dedicated to conducting at least one regulated casino wagering game. The EGM includes a gaming cabinet and an electronic display assembly with a display housing and one or more video display panel mounted to the display housing. Each video display panel is configured to display aspects of a casino wagering game. The EGM also includes a mounting bracket assembly with a first bracket attached to the display housing (or the gaming cabinet), and a second bracket attached to the gaming cabinet (or the display housing). The first bracket includes a first connecting plate with one or more ramped channels and a first stopping member. The second bracket includes a second connecting plate with one or more ramped rails and a second stopping member. The electronic display assembly is mounted onto the gaming cabinet by sliding each of the ramped rails of the first bracket into a respective ramped channel of the second bracket and engaging the first stopping member with the second stopping member.

Other aspects of the present disclosure are directed to casino gaming systems for conducting regulated casino wagering games. For example, disclosed is a gaming system that is primarily dedicated to conducting a wagering game. The gaming system includes a gaming cabinet configured to house electronic components, and an electronic input device mounted on the cabinet. The input device is configured to receive a physical input from a player to initiate a wagering game, and transform the physical input into an electronic data signal. The gaming system also includes game-logic circuitry with a random element generator that is configured to generate, in response to the electronic data signal from the electronic input device, one or more random elements associated with play of the wagering game. Also included is an electronic display assembly with first and second video display panels mounted to a display housing in side-by-side non-coplanar relationship. The first and second video display panels are each configured to display aspects of the wagering game. A mounting bracket assembly includes a first bracket that is rigidly attached to the display housing and a second bracket that is pivotably attached to the gaming cabinet. The first bracket includes a first connecting plate with first and second ramped channels and a stopping flange, whereas the second bracket includes a second connecting plate with first and second ramped rails and a stopping shelf. The electronic display assembly is mounted onto the gaming cabinet by: (1) pivoting the second bracket from a first position to a second position, (2) sliding the first and second ramped rails of the first bracket into the first and second ramped channels of the second bracket, respectively, (3) seating the stopping flange on top of the stopping shelf, and (4) pivoting the second bracket from the second position to the first position.

Additional aspects of this disclosure are directed to mounting assemblies for display arrangements. In an example, disclosed herein is a mounting bracket assembly for mounting an electronic display assembly to a cabinet of an electronic gaming machine. The electronic display assembly including a display housing and one or more video display panels mounted to the display housing. The mounting bracket assembly includes a first bracket that is attached to one of the display housing and the gaming cabinet. The first bracket includes a first connecting plate with a first ramped channel and a first stopping member. The mounting bracket assembly also includes a second bracket that is attached to the other of the display housing and the gaming cabinet. The second bracket includes a second connecting plate with a first ramped rail and a second stopping member. The electronic display assembly is mounted onto the gaming cabinet by sliding the first ramped rail of the first bracket into the first ramped channel of the second bracket and engaging the first stopping member with the second stopping member.

Further aspects of this disclosure are directed to methods and work flow processes for attaching video display arrangements to electronic gaming machines. In an example, a method of mounting an electronic display assembly to a cabinet of an electronic gaming machine is presented. The electronic display assembly includes a video display panel mounted to a display housing. The video display panel is configured to display aspects of a wagering game. The method comprises: providing a mounting bracket assembly which includes first and second bracket members, the first bracket member being attached to the display housing (or the gaming cabinet), the second bracket member being attached to the gaming cabinet (or the display housing), the first bracket member including a first connecting plate with a first ramped channel and a first stopping member, and the second bracket member including a second connecting plate with a first ramped rail and a second stopping member; sliding the first ramped rail of the first bracket member into the first ramped channel of the second bracket; and, engaging the first stopping member with the second stopping member.

The above summary does not represent every embodiment or every aspect of the present disclosure. Rather, the foregoing summary merely provides an exemplification of some of the novel aspects and features set forth herein. The above features and advantages, and other features and advantages of the present disclosure, which are considered to be inventive singly or in any combination, will be readily apparent from the following detailed description of representative embodiments and modes for carrying out the present invention when taken in connection with the accompanying drawings and the appended claims.

BRIEF DESCRIPTION OF THE DRAWINGS

FIGS. 5A and 5B are front and rear perspective-view illustrations, respectively, of the mounting bracket assembly of FIG. 4.

FIGS. 6A-6D sequentially illustrate a method of mounting an electronic display assembly to the cabinet of an electronic gaming machine with the mounting bracket assembly of FIGS. 5A and 5B in accordance with aspects of the present disclosure.

Figure 1:
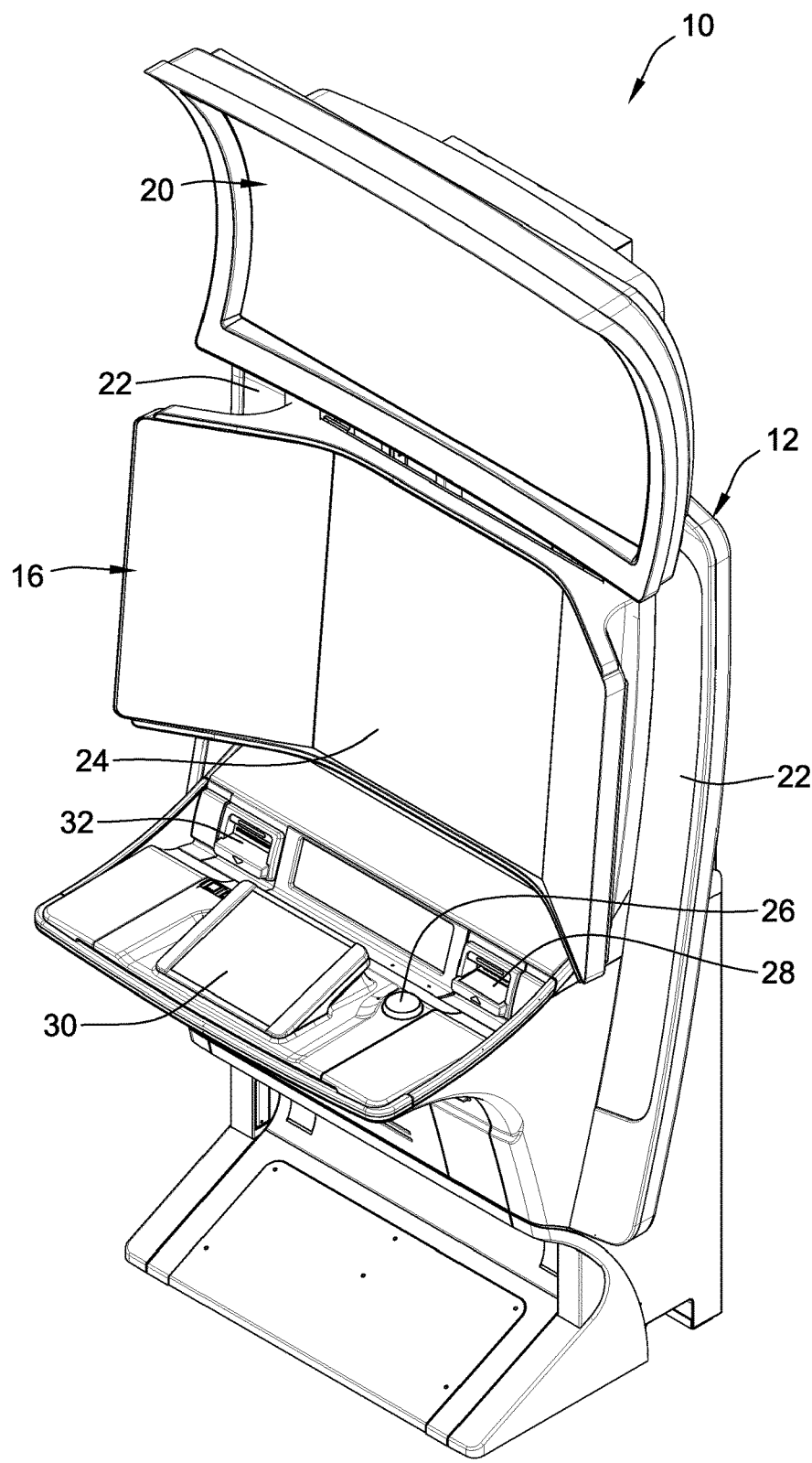
FIG. 1 is a perspective-view illustration of a representative floor-standing electronic gaming machine (EGM) according to aspects of the present disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the invention as defined by the appended claims.

DETAILED DESCRIPTION OF ILLUSTRATED EXAMPLES

This disclosure is susceptible of embodiment in many different forms. There are shown in the drawings, and will herein be described in detail, representative embodiments with the understanding that the present disclosure is to be considered as an exemplification of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed or logically prohibited: the singular includes the plural and vice versa; and the words "including" or "comprising" or "having" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to the drawings, wherein like reference numerals refer to like features throughout the several views, there is shown in FIG. 1 an electronic gaming machine (EGM), designated generally at 10, similar to those operated in gaming establishments, such as casinos. With regard to the present disclosure, the gaming machine 10 may be any type of gaming terminal or machine ("gaming terminal" and "gaming machine" and "gaming device" being used interchangeably in this disclosure) and may have varying structures and methods of operation. For example, in some aspects, the gaming machine 10 is an electromechanical gaming terminal configured to play slots with mechanical reels, whereas in other aspects, the gaming machine is an electronic gaming terminal configured to play a video casino game, such as slots, keno, poker, blackjack, roulette, craps, etc. The gaming machine 10 may take any suitable form, such as floor-standing models (as shown), handheld mobile gaming units, bartop gaming models, workstation-type console models, etc. Further, the gaming machine 10 may be primarily dedicated for use in playing casino wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, all of which are incorporated herein by reference in their respective entireties and for all purposes.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front, side or rear doors that are locked and require a physical or electronic key to gain access to the interior compartment of the cabinet 12 behind the locked door. The cabinet 12 forms an alcove configured to store one or more beverages or personal items of a player. A notification mechanism, such as a candle or tower light, can be mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display area 18, a secondary display area 20, and one or more audio speakers 22. The primary display area 18 may comprise a mechanical-reel display device, one or more video display devices, or a combination thereof. Some configurations comprise a transmissive video display that is disposed in front of the electro-mechanical reels to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. As input devices, the gaming machine 10 includes a touch screen(s) 24 mounted, for example, over one or more screens of the primary display area 18, and one or more push buttons 26 and one or more soft buttons 30 mounted on a player input deck. Also included are a bill/ticket acceptor and card reader/writer 28, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. The value input devices are used to deposit cash or credits onto the gaming machine 10. The cash or credits are used to fund wagers placed on the wagering game played via the gaming machine 10. Examples of value input devices include, but are not limited to, a coin acceptor, the bill/ticket acceptor and card reader/writer 28, a wireless communication interface for reading cash or credit data from a nearby mobile device, and a network interface for withdrawing cash or credits from a remote account via an electronic funds transfer. The value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer, the ticket dispenser for printing tickets redeemable for cash or credits, a wireless communication interface for transmitting cash or credit data to a nearby mobile device, and a network interface for depositing cash or credits to a remote account via an electronic funds transfer.

Figure 2:
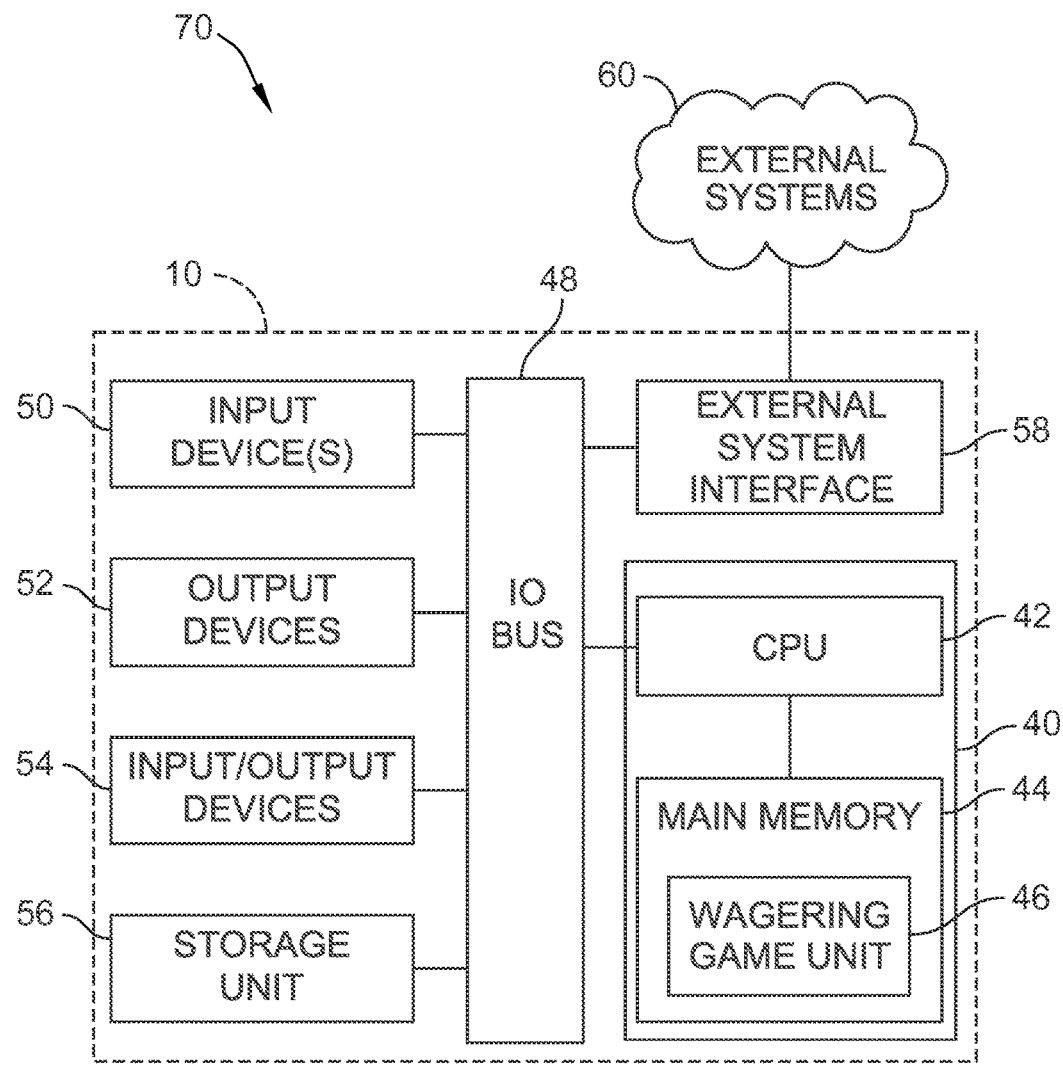
FIG. 2 is a schematic diagram of a representative electronic gaming machine (EGM) in a networked gaming system according to aspects of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks). In the example shown in FIG. 2, the EGM 10 is part of a networked gaming system 70.

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both, are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
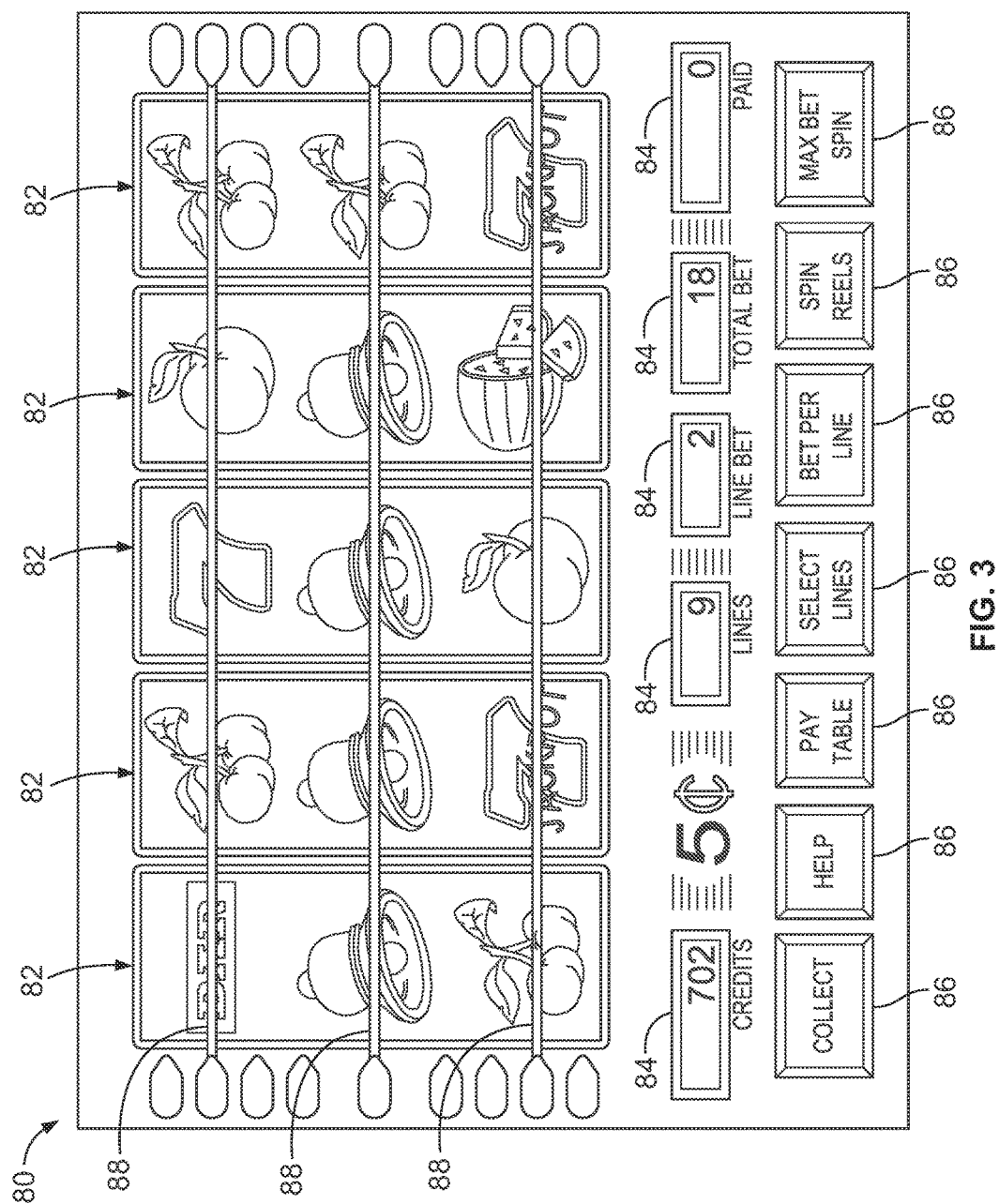
FIG. 3 is a screen shot of a representative basic-game screen of a casino game displayed on a dedicated casino gaming device according to aspects of the present disclosure.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
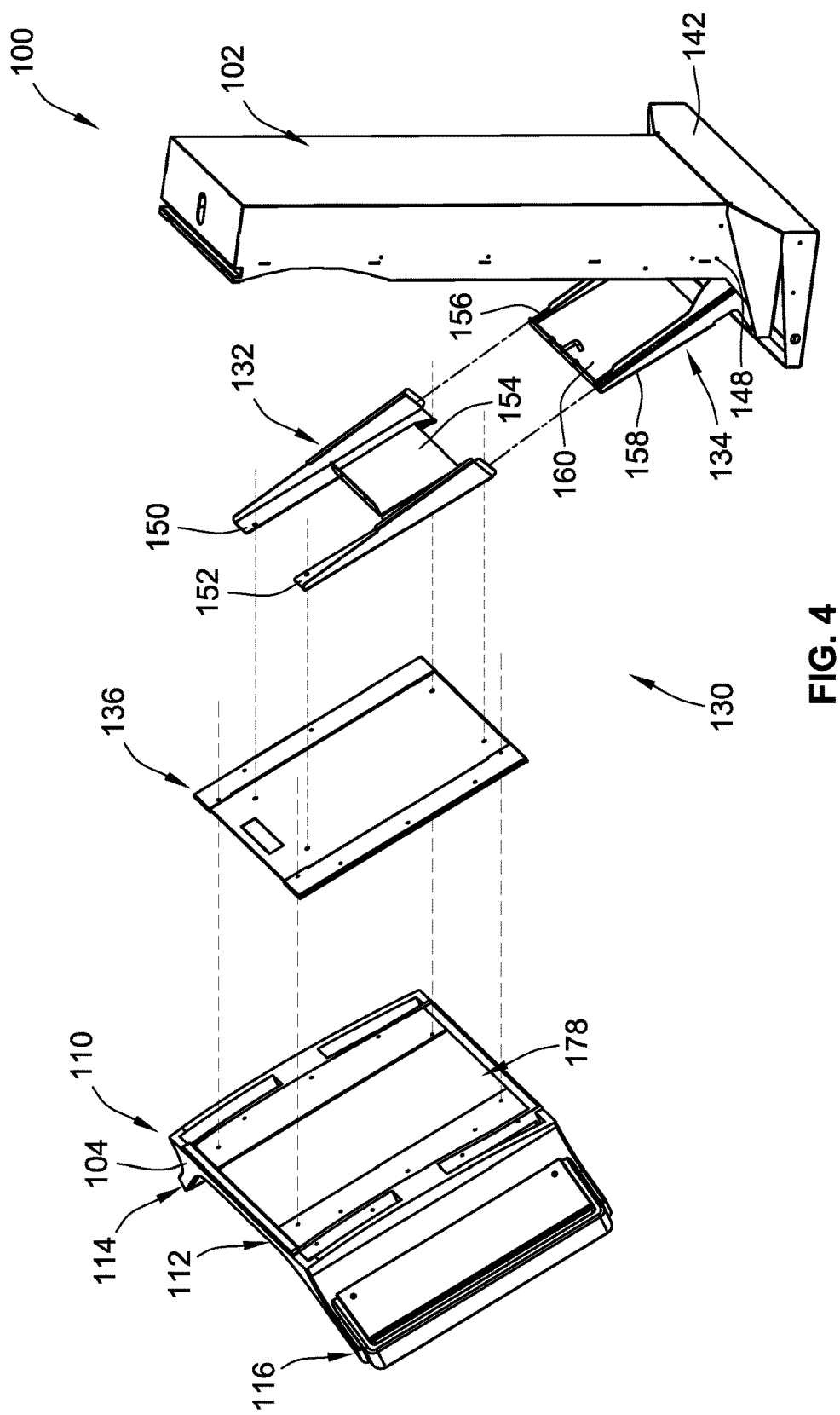
FIG. 4 is a partially exploded perspective-view illustration of a representative mounting bracket assembly, a multi-display video display assembly, and a cabinet of an electronic gaming machine in accordance with aspects of the present disclosure.
Figure 7A:
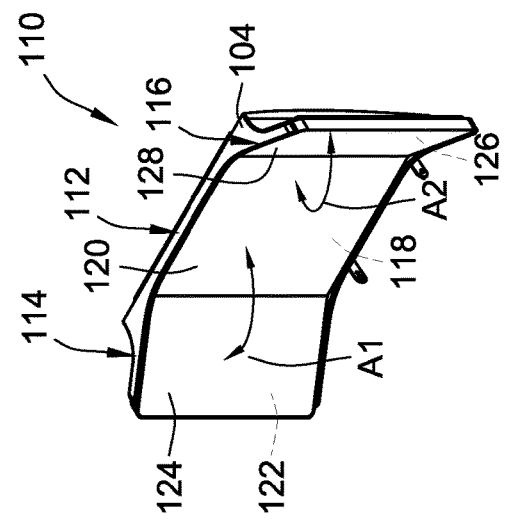
FIGS. 7A and 7B are front and rear perspective-view illustrations, respectively, of the mounting bracket assembly of FIGS. 5A and 5B configured for attaching a multi-display assembly with three video display panels in a horizontal (landscape) orientation.

FIG. 4 is a partially exploded perspective-view illustration of selected segments of a floor-standing electronic wagering game machine 100, namely a cabinet tower 102, a video display assembly 110, and a mounting bracket assembly, which is designated generally as 130. Although differing slightly in appearance, the display assembly 110 (also shown in FIGS. 7A-7B and 8A-8B) can be identical with or otherwise similar in function, operation, and connectivity to the primary display area 18 discussed above with respect to FIG. 1, and, thus, can include any of the corresponding features and options thereof. In the same vein, unless explicitly disclaimed or logically prohibited, any of the disclosed embodiments can share features, options and alternatives with other disclosed embodiments. Display assembly 110 may include, for example, one or more mechanical-reel displays, one or more electronic video displays, one or more transmissive displays, other known display devices, and combinations thereof. As seen in FIG. 7A, the display assembly 110 includes three electronic display devices—a first (central) display device 112, a second (left-hand-side) display device 114, and a third (right-hand-side) display device 116—which are mounted adjacent one another and spaced either horizontally (FIGS. 7A and 7B) or vertically (FIGS. 8A and 8B), e.g., with respect to a cabinet of a gaming terminal. Each of the display devices 112, 114, 116 may take on various forms of electronic displays, including, without limitation, a high-resolution liquid crystal display (LCD), a plasma display, a light emitting diode (LED), an electroluminescent (EL) panel, or any other type of display suitable for use in a gaming terminal. As shown, the central display device 112 is a 26.5" Quad High Definition (QHD) liquid crystal display (LCD) flat panel display, while the left-hand and right-hand-side display devices 114, 116 are each 21.5" High Definition (HD) LCD flat panel displays. In the illustrated example, a display housing 104 provides mounting structure for securing together the three display devices 112, 114, 116 and provides internal packaging space for stowing and securing at least some of the electronic hardware of the electronic display devices 112, 114, 116.

Each display device 112, 114, 116 may display, in some non-limiting examples, a casino wagering game, segments of a wagering game, information associated with wagering games, community games, progressive games, non-wagering games, advertisements, services, premium entertainment, text messaging, emails, alerts or announcements, broadcast information, subscription information, etc. According to the illustrated example, the first electronic display device 112 includes a first video display panel 118 with a first glass panel 120 overlaying or otherwise covering the first video display panel 118. Likewise, the second electronic display device 114 includes a second glass panel 124 overlaying or otherwise covering a second video display panel 122, whereas the third electronic display device 116 includes a third glass panel 128 overlaying or otherwise covering a third video display panel 126. The display panels 118, 122, 126 can be attached to their respective glass panels 120, 124, 128, for example, via a corresponding bezel and insulation assembly (not visible in the views provided). Each video display panel 118, 122, 126 is configured to dynamically display aspects of a wagering game (e.g., moving and static text, graphics, images, etc.).

With continuing reference to FIG. 4 and FIG. 7A, the three display devices 112, 114, 116 are shown mounted side-by-side, in a non-coplanar relationship with one another. In particular, the first electronic display device 112 is mounted at a first location in a first generally vertical orientation, e.g., with respect to the cabinet 102 of the floor-standing gaming terminal 100. The second electronic display device 114, on the other hand, is mounted at a second location in a second generally vertical orientation, while the third electronic display device 116 is mounted at a third location in a third generally vertical orientation, e.g., with respect to the cabinet 102 of the gaming terminal 100. The first, second and third locations are distinct from one another, while the first, second and third orientations are distinct from one another, according to the illustrated example. Electronic display devices 112, 114, 116 are mounted such that a left side (e.g., the left edge in FIG. 7A) of the first display device 112 is adjacent and generally parallel to a right side (e.g., the right edge in FIG. 7A) of the second display device 114, while a right side (e.g., the right edge in FIG. 7A) of the first display device 112 is adjacent and generally parallel to a left side (e.g., the left edge in FIG. 7A) of the third display device 116. The second electronic display device 114 is shown mounted at a first oblique angle A1 to the first electronic display device 112, and the third display device 116 is shown mounted at a second oblique angle A2 to the first electronic display device 112. By way of non-limiting example, the first and second oblique angles A1, A2 are approximately 125-165 degrees or, in some embodiments, approximately 140-150 degrees or, in some embodiments, approximately 145 degrees. It may be desirable, for some configurations, that the oblique angles A1, A2 be distinct from one another.

Figure 7B:
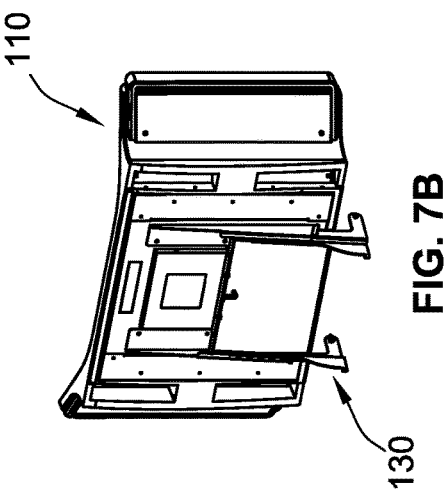

In embodiment illustrated in FIG. 4 and FIGS. 7A-7B, the electronic display devices 112, 114, 116 are spaced horizontally from one another such that the multi-display assembly 110 provides a portrait view of a wagering game environment. However, the relative orientation of the multi-display assembly 110 with respect to the terminal's cabinet is not limited to that which is illustrated. For instance, the three electronic display devices 112, 114, 116 may be horizontally spaced (e.g., FIG. 7A), vertically spaced (e.g., FIG. 8A), diagonally spaced, or a combination thereof, without departing from the intended scope and spirit of this disclosure. To this regard, the electronic display devices 112, 114, 116 are each mounted in a generally vertical orientation in the embodiment shown in FIG. 4 and FIGS. 7A-7B; nevertheless, it is also within the scope of this disclosure for the display devices 112, 114, 116 to take on non-vertical orientations, such as slant top and table top orientations. Other characteristics, such as the relative angle of orientation, the distance of separation, the respective locations on the cabinet, etc., can be varied from that which is shown in the drawings.

To facilitate and simplify the attachment and removal of the multi-display arrangement 110, which can weigh anywhere from approximately 40 lbs (18 kgs) to more than 100 lbs (23-45 kgs) and may require mounting/dismounting from above a cantilevered player input deck (e.g., as seen in FIG. 1), for example, a quick-mount, quick-release mounting bracket assembly 130 is provided for coupling the displays 112, 114, 116 to the cabinet 102. The mounting bracket assembly 130 includes a first bracket 132 that is configured to attach to the display housing 104 or, alternatively, to the gaming cabinet 102, and a second bracket 134 that is configured to attach to the gaming cabinet 102 or, alternatively, to the display housing 104. For the illustrated embodiment, the first bracket 132 rigidly secures to the display housing 104 while the second bracket 134 pivotably attaches to the gaming cabinet 102. In particular, the mounting bracket assembly 130 may optionally comprise a housing mount plate 136 which rigidly secures to a rear segment of the display housing 104, e.g., via one or more threaded fasteners (not shown). The first bracket 132, in turn, rigidly secures to the housing mount plate 136, e.g., via one or more threaded fasteners, and thereby rigidly secures to the display housing 104. Alternative configurations might implement a first bracket 132 that is configured to attach directly to the housing 104 or to rotatably attach to the cabinet 102.

By way of comparison to the first bracket 132, first and second pivot arms 138 and 140, respectively, that are integrally formed at the bottom end of the second bracket 134 are configured to rotatably attach the bracket 134 to a base plate 142 of the gaming cabinet tower 102, e.g., via respective hinge pins (not shown). In so doing, the second bracket 134 can be selectively pivoted back-and-forth between a first (functional) position and a second (non-functional) position. When in the first position (e.g., FIG. 6D), the second bracket 134 is in a generally vertical orientation with respect to the cabinet 102 and positioned such that the electronic display assembly 110 is irremovably secured to the gaming cabinet 102. On the other hand, when moved to the second position (e.g., FIGS. 6A-6C), the second bracket 134 is suspended in a generally oblique orientation with respect to the cabinet 102 such that the electronic display assembly 110 is readily removable from the gaming cabinet tower 102. Optionally, the second bracket 134 includes first and second integrally formed pivot stops 144 and 146, respectively, that are each configured to engage with a respective stopping pin 148 (only one of which is labelled in the drawings) that projects from an inside surface of gaming cabinet tower 102 to thereby restrict the pivot range of the second bracket 134, e.g., to less than approximately 45 degrees. When the second bracket 134 is pivoted from the second position (e.g., FIG. 6A) back to the first position (e.g., FIG. 6D), it can be locked into place, for example, with a selectively releasable ratchet-and-pawl latch (not shown). Alternative configurations can implement a second bracket 132 that is configured to rigidly attach to the housing 104 or that pivotably mounts to the cabinet 102 at alternative locations and/or via alternative means.

Quick-mount, quick-release mounting bracket assembly 130 can be considered a male-female type rail connector designed to simplify and expedite the process of mounting/dismounting the video display assembly 110. Turning next to FIGS. 5A and 5B, the first bracket 132, which is also referred to herein as "female bracket member," includes at least one or, in the illustrated example, a pair of elongated channels (or "outer rails"), namely a first ramped channel 150 that is spaced from and generally parallel to a second ramped channel 152. First connecting plate 154 extends between and connects the first ramped channel 150 to the second ramped channel 152 such that each channel 150, 152 is disposed along a respective edge of the connecting plate 154. By comparison, the second bracket 134, which is also referred to herein as "male bracket member," includes at least one or, in the illustrated example, a pair of elongated ("inner") rails, namely a first rail 156 that is spaced from and generally parallel to a second ramped channel 158. Second connecting plate 160 extends between and connects the first ramped rail 156 with the second ramped rail 158 such that each rail 156, 158 is disposed along a respective edge of the connecting plate 160. As will be developed in further detail hereinbelow, the male and female bracket members 132, 134 are operatively mated by sliding each of the ramped rails 156, 158 into a respective ramped channel 150, 152 and engaging a first stopping member, which is represented herein by stopping flange 162 at the top of connecting plate 154, with a second stopping member, which is represented herein by stopping shelf 164 at the top of connecting plate 160. It is desirable, for at least some embodiments, that the first bracket 132 be fabricated as a first single-piece unitary structure (e.g., formed, cut and processed from a first piece of sheet metal), and the second bracket 134 be fabricated as a second single-piece unitary structure (e.g., formed, cut and processed from a second single piece of sheet metal).

Mounting bracket assembly 130 is provided with structural features that streamline the process of mounting the video display assembly 110. As some non-limiting examples, the bracket members 132, 134 are provided with complementary self-aligning structural features that cooperate to automatically center and orient the first bracket member 132 and, thus, the display assembly 110, with the second bracket member 134 and, thus, the gaming machine cabinet 102. The first and second ramped channels 150, 152 have respective proximal (lower) ends opposing respective distal (upper) ends with respective openings 151 and 153 at their proximal ends through which are received the first and second ramped rails 156, 158. The channel heights CH1 and CH2 of the ramped channels 150, 152 vary along the longitudinal length of the channels. In particular, channel heights CH1 and CH2 get progressively smaller in a direction from the proximal ends to the distal ends of the ramped channels 150, 152 such that each channel is provided with a ramped inner surface 155 and 157, respectively, that is angled with respect to the longitudinal central axis of the first bracket 132. Likewise, the first and second ramped rails 156, 158 have respective proximal (upper) ends opposing respective distal (lower) ends, the proximal ends being first received through respective openings 151, 153 in the first and second ramped channels 150, 152. The rail heights RH1 and RH2 of the ramped rails 156, 158 vary along the longitudinal length of the channels. Specifically, rail heights RH1 and RH2 get progressively larger in a direction from the proximal ends to the distal ends of the ramped rails 156, 158 such that each rail is provided with a ramped outer surface 159 and 161, respectively, that is angled with respect to the longitudinal central axis of the second bracket 134. When the rails 156, 158 are inserted into their respective channels 150, 152, the ramped inner surfaces 155, 157 slide along the ramped outer surfaces 159, 161 to thereby guide the second bracket 134 into the first bracket 132 and help center and orient the bracket members.

Some other examples of structural features that streamline the mounting process of the video display assembly 110 include first and second pairs of guide lips 166 and 168, respectively, wherein each guide lip projects obliquely from an opposing side of a respective opening 151, 153, as seen in FIGS. 5A and 5B. The proximal ends of the ramped rails 156, 158, as they're being inserted into the openings 151, 153 of the ramped channels 150, 152, slide against the guide lips 166, 168, which function to axially align the rails with the channels. In a similar regard, each ramped rail 156, 158 of the second bracket 134 is provided with a respective guide flange 170 and 172 that extends longitudinally along the length of the rail. These guide flanges 170, 172 slide against complementary flanges 174 and 176, respectively, of the first bracket 132 and thereby maintain alignment of the ramped channels 150, 152 with the ramped rails 156, 158 during insertion thereof.

The sequence of illustrations presented in FIGS. 6A-6D portray a representative method of mounting an electronic display assembly 110 to the cabinet 102 of an electronic gaming machine 100 with the mounting bracket assembly 130 of FIGS. 5A and 5B. Beginning at FIG. 6A, the first step of the method comprises unlatching the second bracket 134, e.g., by pulling on a release lever of a selectively releasable ratchet-and-pawl latch, and pivoting the second bracket 134 from the first (functional) position to the second (non-functional) position, both of which were described above. The hook-shaped pivot stops 144 and 146 on the back of the pivot arms 138 and 140 ensure that the second bracket 134 is retained at a predetermined angle with respect to the cabinet 102. The display assembly 110, including the display housing 104 and the first bracket 132, is then positioned such that openings 151, 153 at respective ends of the ramped channels 150, 152 align with respective proximal ends of the ramped rails 156, 158. In the second step illustrated in FIG. 6B, the ramped rails 156, 158 are seated against the guide lips 166, 168 and then slid into the openings 151, 153 of the ramped channels 150, 152. Under the force of gravity, the first and second ramped rails 156, 158 of the first bracket 132 are slid in a telescoping manner down through the first and second ramped channels 150, 152 of the second bracket 134 until the stopping flange 162 seats on top of the stopping shelf 164, as the third step indicated in FIG. 6C. Mechanical fasteners are then applied to secure the first bracket 132 to the second bracket 134, and electrical connectors for the display devices 112, 114, 116 are contemporaneously connected. Finishing at FIG. 6D, the fourth step includes pivoting the second bracket 134, along with the first bracket 132 and display assembly 110, from the second position back to the first position and locking the entire assembly into place, for example, with the ratchet-and-pawl latch. In some embodiments, the aforementioned method includes at least those steps enumerated above. It is also within the scope and spirit of the present disclosure to omit steps, include additional steps, and/or modify the order presented. It should be further noted that the method can be practiced in a reverse order as a representative method of dismounting the electronic display assembly 110 from the cabinet 102.

The mounting bracket assembly 130 can include other optional features and alternative structural configurations. As one example, the housing mount plate 136 can be designed to cooperate with the display housing 104 to define a single electronics compartment 178 within which can be mounted electronic componentry of all three of the video display panels 112, 114, 116. In so doing, the display electronics, such as the panel control board, touchscreen control board, TFT display connection interfaces, etc., are positioned behind a single display of the multi-display package, e.g., behind the center display of a three-display package. As another optional feature, the second bracket 134, when moved to the first (functional) position, can cooperate with the gaming cabinet 102 to define an EMI containment box within which is mounted electronic componentry of the gaming machine 100.

Figure 8A:
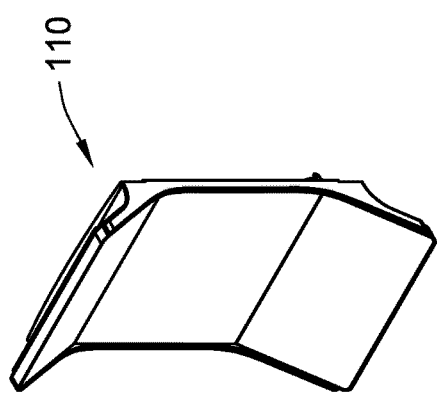
FIGS. 8A and 8B are front and rear perspective-view illustrations, respectively, of the mounting bracket assembly of FIGS. 5A and 5B configured for attaching a multi-display assembly with three video display panels in a vertical (portrait) orientation.
Figure 9A:
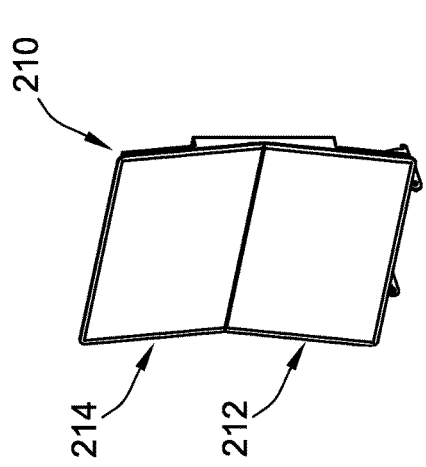
FIGS. 9A and 9B are front and rear perspective-view illustrations, respectively, of the mounting bracket assembly of FIGS. 5A and 5B configured for attaching a multi-display assembly with two video display panels in a horizontal (landscape) orientation.
Figure 8B:
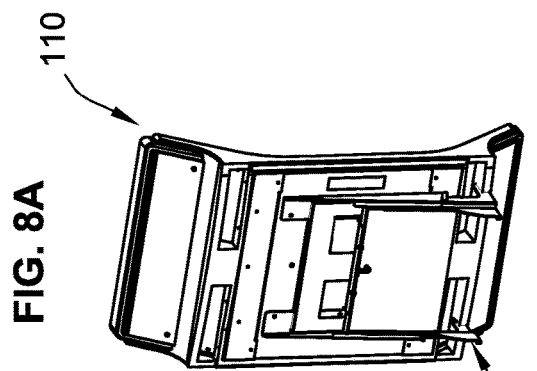
Figure 9B:
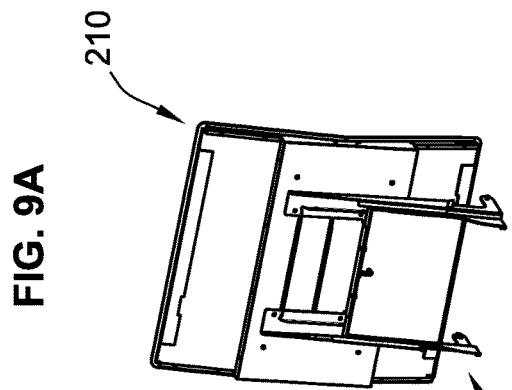

FIGS. 7A-7B are front and rear illustrations, respectively, of the mounting bracket assembly 130 of FIGS. 5A-5B positioned to attach the multi-display assembly 110 with three video display panels 112, 114, 116 in a horizontal (landscape) orientation on the gaming cabinet 102. By comparison, FIGS. 8A-8B illustrate the mounting bracket assembly 130 positioned to attach the display assembly 110 on the gaming machine cabinet 102 in a vertical (portrait) orientation. FIGS. 9A-9B, on the other hand, illustrate an embodiment where the mounting bracket assembly 130 of FIGS. 5A-5B is operable for attaching a multi-display assembly 210 with two video display panels 212, 214 to the gaming machine cabinet 102 in a horizontal (landscape) orientation.

The present invention is not limited to the precise construction and compositions disclosed herein; any and all modifications, changes, and variations apparent from the foregoing descriptions are within the spirit and scope of the invention as defined in the appended claims. Moreover, the present concepts expressly include any and all combinations and subcombinations of the preceding elements and aspects.

What is claimed:

1. An electronic gaming machine primarily dedicated to conducting at least one regulated casino wagering game, the electronic gaming machine comprising:
   a gaming cabinet;
   an electronic display assembly including a display housing and a first video display panel mounted to the display housing, the first video display panel being configured to display aspects of a casino wagering game;
   a mounting bracket assembly including a first bracket attached to the display housing, and a second bracket attached to the gaming cabinet, the first bracket including a first connecting plate with a first ramped channel and a first stopping member, and the second bracket including a second connecting plate with a first ramped rail and a second stopping member,
   wherein the electronic display assembly is mounted onto the gaming cabinet by sliding the first ramped rail of the first bracket into the first ramped channel of the second bracket and the electronic display assembly, under the continuous force of gravity, is then guided by the first ramped rail and first ramped channel until the first stopping member engages with the second stopping member; and
   wherein the second bracket is rotatably and directly attached to the gaming cabinet to pivot about a horizontal axis between a first generally oblique open position with respect to the gaming cabinet, whereat the electronic display assembly is mountable to and removable from the gaming cabinet, and a second generally vertical closed position with respect to the gaming cabinet, whereat the electronic display assembly is irremovably secured to the gaming cabinet.

2. The gaming machine of claim 1, wherein the first bracket includes a second ramped channel connected to the first ramped channel by the first connecting plate, and the second bracket includes a second ramped rail connected to the first ramped rail by the second connecting plate, and wherein mounting the electronic display assembly onto the gaming cabinet further includes sliding the second ramped rail into the second ramped channel.

3. The gaming machine of claim 1, wherein the first ramped channel has a proximal end, opposite a distal end, with an opening through which is received the first ramped rail, a channel height of the first ramped channel getting progressively smaller in a direction from the proximal end to the distal end.

4. The gaming machine of claim 1, wherein the first ramped rail has a proximal end, opposite a distal end, first received by the first ramped channel, a rail height of the first ramped rail getting progressively larger in a direction from the proximal end to the distal end.

5. The gaming machine of claim 1, wherein the second bracket includes a pivot stop configured to engage with a stopping pin projecting from the gaming cabinet to thereby restrict a range of pivot of the second bracket.

6. The gaming machine of claim 1, wherein the electronic display assembly further includes a second video display panel mounted to the display housing in side-by-side relationship to the first video display panel.

7. The gaming machine of claim 6, wherein the first video display panel is oriented at an oblique angle with respect to the second video display panel.

8. The gaming machine of claim 6, wherein the first and second video display panels are spaced horizontally with respect to the gaming cabinet.

9. The gaming machine of claim 6, wherein the mounting bracket assembly further includes a housing mount plate attaching the first bracket or the second bracket to the display housing.

10. The gaming machine of claim 9, wherein the housing mount plate cooperates with the display housing to define a single electronics compartment within which is mounted electronic componentry of both the first and second video display panels.

11. The gaming machine of claim 1, wherein the first ramped channel has an opening at one end thereof through which is received the first ramped rail, the first ramped channel further including a guide lip proximate the opening and configured to align the first ramped rail for insertion into the first ramped channel.

12. The gaming machine of claim 1, wherein the first ramped rail has a guide flange extending longitudinally along the length thereof and configured to maintain alignment of the first ramped channel with the first ramped rail during insertion thereof.

13. The gaming machine of claim 10, wherein the second bracket cooperates with the gaming cabinet to define a containment box within which is mounted electronic componentry of the gaming machine.

14. The gaming machine of claim 10, wherein the first bracket is a first single-piece unitary structure, and the second bracket is a second single-piece unitary structure.

15. A method of mounting an electronic display assembly to a cabinet of an electronic gaming machine, the electronic display assembly including a display housing and a video display panel mounted to the display housing, the video display panel being configured to display aspects of a wagering game, the method comprising:
   providing a mounting bracket assembly including first and second bracket members, the first bracket member being attached to the display housing, the second bracket member being attached to the gaming cabinet, the first bracket member including a first connecting plate with a first ramped channel and a first stopping member, and the second bracket member including a second connecting plate with a first ramped rail and a second stopping member, the second bracket member rotatably and directly attached to the gaming cabinet to pivot about a horizontal axis;

sliding the first ramped rail of the first bracket member into the first ramped channel of the second bracket; and then, continuously assisted by the force of gravity, lowering the display housing, guided by the ramped rail and ramped channel, until the first stopping member engages with the second stopping member; and pivoting the display assembly about a horizontal axis between a first generally oblique open position with respect to the gaming cabinet, whereat the electronic display assembly is mountable to the gaming cabinet, to a second generally vertical closed position with respect to the gaming cabinet, whereat the electronic display assembly is irremovably secured to the gaming cabinet.

16. A mounting bracket assembly for mounting an electronic display assembly to a cabinet of an electronic gaming machine, the electronic display assembly including a display housing and a video display panel mounted to the display housing, the mounting bracket assembly comprising:

a first bracket attached to the display housing, the first bracket including a first connecting plate with a first ramped channel and a first stopping member; and a second bracket attached to the gaming cabinet, the second bracket including a second connecting plate with a first ramped rail and a second stopping member, wherein the electronic display assembly is mounted onto the gaming cabinet by sliding the first ramped rail of the first bracket into the first ramped channel of the second bracket; and the electronic display assembly, under the continuous force of gravity, is then guided by the first ramped rail and first ramped channel until the first stopping member engages with the second stopping member; and wherein the second bracket is rotatably and directly attached to the gaming cabinet to pivot about a horizontal axis between a first generally oblique open position with respect to the gaming cabinet, whereat the electronic display assembly is mountable to and removable from the gaming cabinet, and a second generally vertical closed position with respect to the gaming cabinet, whereat the electronic display assembly is irremovably secured to the gaming cabinet.

17. The mounting bracket assembly of claim 16, wherein the first bracket includes a second ramped channel connected to the first ramped channel by the first connecting plate, and the second bracket includes a second ramped rail connected to the first ramped rail by the second connecting plate, and wherein mounting the electronic display assembly onto the gaming cabinet further includes sliding the second ramped rail into the second ramped channel.

18. The mounting bracket assembly of claim 16, wherein the first ramped channel has a proximal end, opposite a distal end, with an opening through which is received the first ramped rail, a channel height of the first ramped channel getting progressively smaller in a direction from the proximal end to the distal end, and wherein the first ramped rail has a proximal end, opposite a distal end, first received by the first ramped channel, a rail height of the first ramped rail getting progressively larger in a direction from the proximal end to the distal end.

* * * * *